Figure 1:
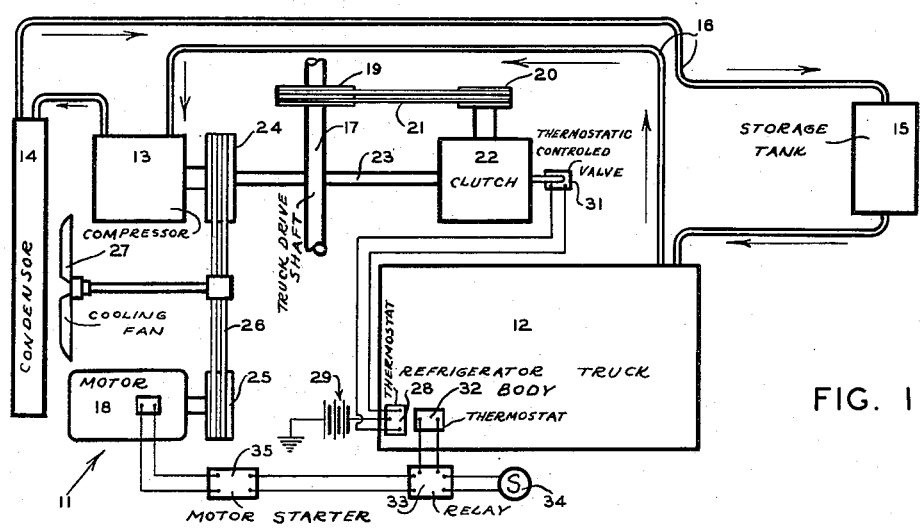

Oct. 21, 1952     A. C. RATERMANN     2,614,396

REFRIGERATING SYSTEM FOR MOTOR VEHICLES

Filed Jan. 30, 1947     2 SHEETS—SHEET 1

INVENTOR
ALFRED C. RATERMANN

BY John H. Cassidy

ATTORNEY

Oct. 21, 1952 A. C. RATERMANN 2,614,396
REFRIGERATING SYSTEM FOR MOTOR VEHICLES
Filed Jan. 30, 1947 2 SHEETS—SHEET 2

INVENTOR
ALFRED C. RATERMANN
BY John H. Cassidy
ATTORNEY

Patented Oct. 21, 1952

2,614,396

UNITED STATES PATENT OFFICE 2,614,396

REFRIGERATING SYSTEM FOR MOTOR VEHICLES

Alfred C. Ratermann, St. Louis, Mo.

Application January 30, 1947, Serial No. 725,310

6 Claims. (Cl. 62—4)

This invention relates to improvements in a refrigerating system for motor vehicles such as is illustrated and described in a patent to William Ryan, Jr., et al., U. S. Serial No. 2,382,667, for Refrigerating System for Motor Vehicles, filed April 26, 1943.

In the aforesaid patent a refrigerating system is disclosed in which a compressor is driven from a drive shaft of a motor vehicle through a speed reducing mechanism and a free wheeling unit in a first instance, and by an electric motor through a free wheeling unit in a second instance to provide refrigeration for the body of the vehicle. Through this system, power is supplied from the engine of the motor vehicle to refrigerate the vehicle body while the same is in transit and by the electric motor when the vehicle is stopped. The arrangements of the drives are such that no manual operation such as shifting gears or making an adjustment to the power train is required when changing the system from engine to motor drive or vice versa. All that is required to effect the motor driving of the system is to plug in a cord to a suitable source of electrical supply, and by this simple operation the vehicle body may be maintained at a given degree of refrigeration when the truck is stopped for any reason such as lay-overs, loading and unloading, etc.

In operating the device described in the aforementioned patent it is required that control of the refrigeration system during transit, that is, when the same is powered by the vehicle engine, be effected by by-passing the refrigerant in the compressor. Further, the refrigerating system, per se, applies a continuous load on the engine's drive shaft and is subject to all of the irregular applications of power caused by jerks in starting the vehicle in motion. Moreover, the compressor of the refrigerating system is always in operation when the truck is moving regardless of whether regrigeration to the truck body is required or not.

Accordingly, it is a general object of the instant invention to provide a refrigeration system of the type described that is powered from a truck engine when the truck is in motion through a hydraulically operated clutch mechanism which is automatically operated to connect the compressor of the system to the engine drive when and only when refrigeration is required, which places the refrigeration system in operation only after the truck has started and has acquired a smooth operating speed, and one which is entirely automatic in operation.

Figure 4:
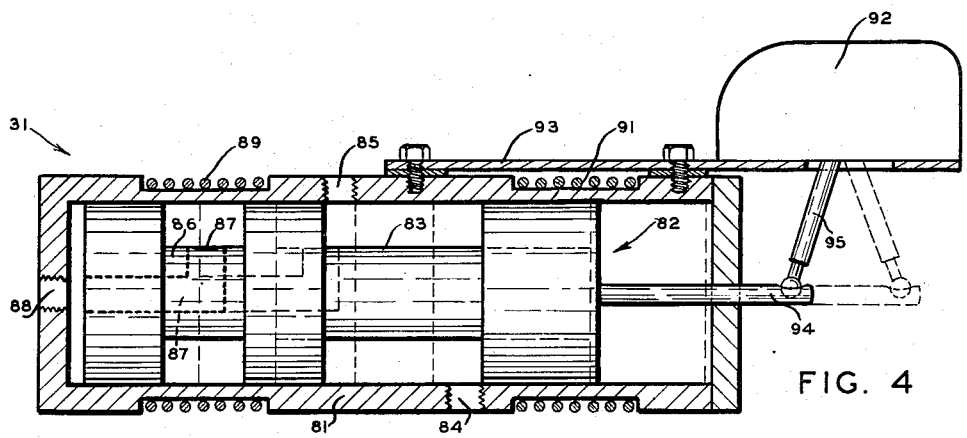
Figure 5:
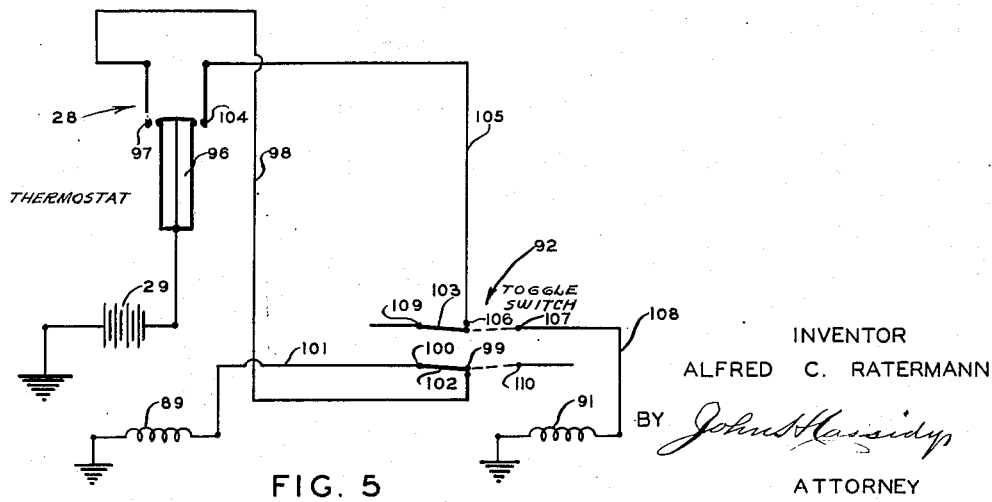
Figures 2, 3:
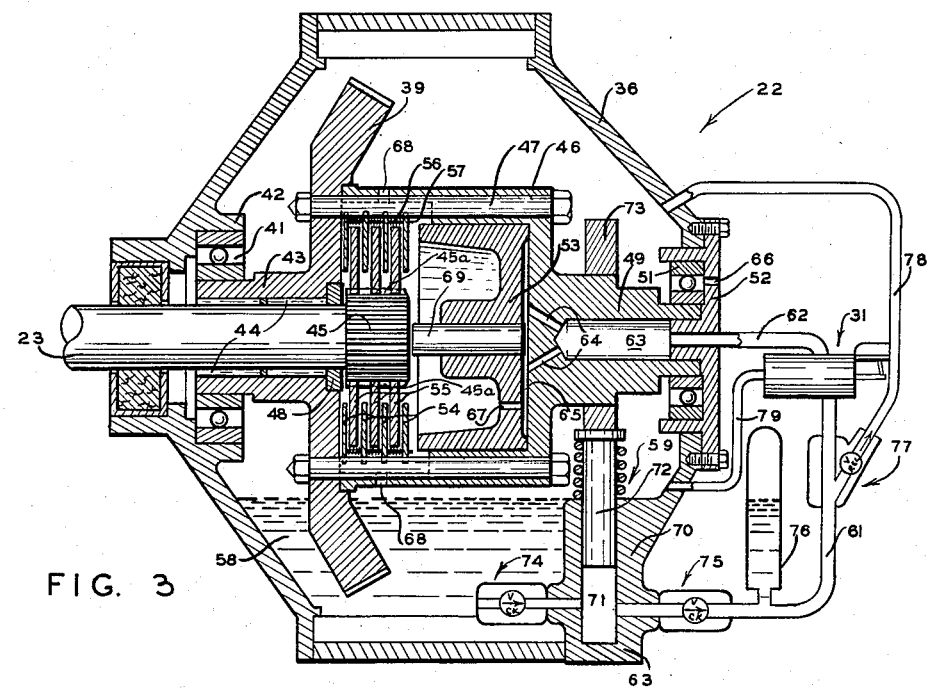

Other objects and advantages will become apparent as the description proceeds and a more comprehensive understanding of the invention will be afforded from the following detailed specification when considered in conjunction with the accompanying drawings, in which Fig. 1 is a schematic diagram of a refrigeration system for motor vehicles embodying the instant invention, Fig. 2 is a plan view, with parts removed, of the system illustrated in Fig. 1, showing the driving and driven elements of the system only, Fig. 3 is a vertical sectional view of a hydraulically operated clutch employed in the system illustrated in Figs. 1 and 2, Fig. 4 is a longitudinal sectional view of a solenoid valve employed with the hydraulically operated clutch, illustrated in Fig. 3 to control the flow of fluid thereto, and Fig. 5 is a wiring diagram of the control circuit for the solenoid valve shown in Fig. 4.

With particular reference to Fig. 1 of the drawings and, for greater detail, to the patent aforementioned, the system embodying the instant invention comprises a refrigerating device generally designated 11 which supplies refrigeration to a truck body 12 of a motor vehicle, not shown. The refrigerating device 11 includes a compressor 13, a condenser 14, a coolant reservoir or storage tank 15, an evaporator (not shown) in the truck body 12, and necessary piping 16.

The compressor 13 is driven in one instance, that is, when the vehicle is in motion and refrigeration is required, by power taken from a driveshaft 17 of the vehicle and in a second instance, e. g. when the truck is stopped and refrigeration is required, by an electric motor 18, for the reasons stated in the aforementioned patent. Here, however, the power taken from the driveshaft 17 is transmitted to the compressor 13 through two pulleys 19 and 20, and a belt 21 constituting a power take-off, a hydraulically operated friction clutch 22, a shaft 23 and a pulley 24. Also, the compressor 13 is driven by the motor 18 through an over-running or unidirectional clutch 25, a belt 26 and the pulley 24. A fan 27 is driven from both the drive shaft 17 and the motor 18 through its connections with the belt 26 to air cool the condenser 14.

Control of the refrigerating device, in one instance, is effected by a thermostat 28 located in the truck body 12. A source of electrical energy 29 supplies current for the thermostat 28 which operates a solenoid valve 31 for the hydraulically operated clutch 22. When the refrigerating system is powered by the motor 18, a second thermostat 32 is in control to operate a relay 33. The latter element, in turn, controls current from a suitable 110–220 volt source 34, through a motor starter 35 to the motor 18.

The hydraulically operated friction clutch 22, through which power is transmitted from the drive shaft 17 to the compressor 13, is illustrated in Fig. 3. It includes a housing 36 which encloses the working parts of the clutch. Within this housing is retained a pinion 37 (Fig. 2) which is attached to a shaft 38 passing through the housing 36 and mounting the pulley 20. Meshing with the pinion 37 is a ring gear 39, which is mounted for rotation in a bearing 41 secured in a bearing retainer 42 formed in the housing wall. A hub 43 of the gear 39 is bored to receive the driven shaft 23 which latter element is bearinged within the hub 43 by a plurality of pin bearings 44. A head 45 on the shaft 23 extends into a piston cylinder 46 which is bolted onto the gear 39, to rotate therewith, by a plurality of bolts 47, the said head 45 acting against a thrust bearing 48. The cylinder 46 has a hub section 49 that extends into a bearing 51 mounted in a retainer formed as a part of a closure plate 52 which is bolted to the housing 36.

Within the cylinder 46, a piston 53 is free to move against the first of a plurality of flat, ringlike frictional clutch plates 54 which rotate with the cylinder 46 and intermesh with a plurality of similarly shaped clutch elements 55 arranged on the head 45 of the shaft 23 to move longitudinally of the head and to rotate therewith. Here, the elements 55 are bored centrally to pass over the head 45, the latter having keys 45a which pass into grooves opening into the central bore of each plate. Thus, the plates 55 are free to move along the keys 45a and are engaged thereby to rotate with the head. The clutch plates 54 are held in place and to rotate with the cylinder 46 by the several bolts 47, which engage in half-circularly shaped recesses cut in the peripheral edges of the plates. They are thus free to move longitudinally of the bolts 47 and to be compressed together under forces exerted by the piston 53. A plurality of springs 56 are retained between each of the plates 54 on pins 57 passed through the plates at spaced intervals around the faces thereof to provide the restoring forces which separate the plates when the piston 53 is not acting against them.

The piston 53 is moved to engage the frictional elements 54 and 55 of the clutch by fluid which is contained within the housing 36, the bottom section 58 thereof acting as a reservoir. This fluid, which may take the form of a light oil, is pumped from the reservoir 58 by a pump 59 into a line 61, through the solenoid operated valve 31 and the line 62 into a bore 63 in the cylinder hub 49. From this point, the oil is delivered through two ports 64 to a chamber 65 within the cylinder 46 where it acts against the piston 53.

To open the housing 36 to atmospheric pressure, a small vent hole 66 is drilled in the closure plate 52. Also, and for bleeding fluid around the piston 53 a bleeder, taking the form of a small hole 67 drilled in the piston, is provided. The fluid which passes around the piston 53 is returned to the reservoir 58 through a plurality of holes 68 drilled at spaced intervals around the cylinder 46.

With further reference to the piston 53, the same is bored centrally to receive a pin 69. This pin which is supported between the head 45, and an end wall of the chamber 65, acts as a second thrust bearing for the shaft 23, the same being urged against the head 45 by hydraulic pressure.

The pump 59, which supplies oil to the cylinder, may take any suitable form, but is here illustrated as being of the piston type. A portion 70 of the housing 36 forms a pump cylinder 71 in which a spring biased pump piston 72 is reciprocated. The piston 72 is driven by an eccentric cam 73 fixed to the cylinder hub 49, and draws oil from the reservoir through a check valve 74 located on the intake side of the pump. A second check valve 75 is connected in the line 61 on the outlet side of the pump and an expansion chamber 76 is also connected in this line. A pressure relief valve 77 located in the line 61 is provided to by-pass excessively high pressure fluid into a relief line 78 connecting with the housing 36. The hydraulic circuit is completed by a bleeder line 79 connecting the solenoid valve 31 with the housing 36 to form a return to the reservoir 58.

The hydraulic valve 31, provided to control the flow of fluid to the clutch 22, will be described with the aid of Fig. 4. It comprises a cylinder 81 in which a piston 82 is movable to open and close, in proper sequence, the various parts of the valve. The piston 82, which also acts as an armature for the solenoid, has a reduced section 83, that connects an inlet opening 84, receiving the line 61, with an outlet opening 85 receiving the line 62, when the valve is in its open position as illustrated by the full line drawing of the piston 82.

When the piston 82 is in its closed position, indicated by the dotted lines, Fig. 4, the opening 84 is closed from the opening 85 and the latter communicates with a second reduced section 86 of the piston. Further, the piston 82, is drilled to form a port 87 which connects the opening 85 with a bleeder opening 88 that receives the line 79.

The piston 82 is moved to open and close the valve by two solenoid windings 89 and 91 which are wound about the cylinder 81 as shown.

A toggle switch 92, which is mounted on a plate 93 secured to the cylinder 81, is also operated by the piston 82. An arm 94 fixed to the piston 82 and connected with a switch operating lever 95, forms the switch actuating linkage.

The particular function of the switch 92 will be described later in connection with the vehicle powered operation of the refrigerating system, but first it is desirous to point again to the general operation of the device.

When the vehicle is stopped for any reason, refrigeration is supplied to the body 12 through the power of the motor 18. Here, the motor 18 is under the control of the thermostat 32 and refrigeration is provided when called for by this element with an operating cycle which need not be described.

On the other hand, when the vehicle is in transit, power for driving the refrigerating system is supplied from the drive shaft 17, and numerous operating problems, all solved in the instant invention, are encountered.

An operating cycle of the system, embodying the instant invention, may be thought of as beginning with the vehicle being put in motion, it being pointed out that when the truck was stopped the clutch 22 was disengaged in one of two ways. If the thermostat 28 was calling for refrigeration at the time the vehicle came to a stop, then the clutch 22 was disengaged by the release of oil pressure acting on the piston 53 by the bleeder 67. If the thermostat was not calling for refrigeration and had not yet moved to close the valve 31 this same condition would have been obtained. As a third condition, if the thermostat had operated to close the valve 31, pressure in the chamber 65, would have been released through the line 79 to disengage the clutch.

With the clutch thus released under any one of all possible conditions, it will be seen that as the vehicle starts, the refrigerating system is disconnected from the drive shaft 17. It is thus free from shocks or jerks caused by the irregular starting motion of the vehicle. And this is true whether or not the thermostat 28 is calling for refrigeration. If it is and the valve 31 is open, the clutch 22 will not engage until the pump 59 builds up a sufficient pressure in the chamber 65 to engage the clutch. By this time, the vehicle is operating smoothly. Obviously, if the thermostat is not calling for refrigeration, the valve 31 is closed and the clutch is disengaged.

Moreover, it is obvious that the compressor of the refrigerating system is in operation when the vehicle is in transit only when refrigeration is called for. This is made possible by the thermostatically controlled valve 31 which affords completely automatic on and off operation of the compressor 13.

In practice, certain operating difficulties have been encountered in using a conventional solenoid valve wherein the windings are continuously energized to hold the valve open or closed. Principally these windings overheat the valve piston and cause the valve to lock. In the present case, this difficulty is overcome by the valve 31 of the instant invention, and its operation will be described with reference to Fig. 5.

Thus, as the bimetallic element 96 of the thermostat 28 moves to its contact 97 to call for refrigeration, the solenoid winding 89 is energized from the source 29 through a line 98, a terminal 99 and a contact 100 of the switch 92 and a line 101, to move the piston 82 of the valve 31 to its full line position as shown in Fig. 4. In sequence with this movement of the piston 82, the operating lever 95 of the switch 92 is moved to snap the switch blades 102 and 103 from their full line to their dotted line position as indicated in Fig. 5. This action cuts off current to the winding 89 and conditions the thermostat 28 to energize the solenoid winding 91 in the following manner. When the call for refrigeration is satisfied, the element 96 moves to a contact 104 and the winding 91 is energized from the source 29 through a line 105, a terminal 106 and a contact 107 of the switch 92 and a line 108, to move the piston 82 to its dotted line position and close the valve 31. Here again, and in sequence, the piston 82 moves the switch blades 102 and 103 back to their full line positions, as indicated, to cut off current to the winding 91 and condition the thermostat 28 for recycling. The contacts 109 and 110 are open.

From the foregoing, it will be clear that the windings 89 and 91 are energized momentarily and then they are cut off. This prevents heating and eliminates a drain on the source 29, which is the battery of the vehicle's ignition system.

Various changes may be made in the details of construction within the scope of the appended claims, without departing from the spirit of this invention. Parts of the invention may be used without the whole and improvements may be added while retaining some or all of the advantages of the invention.

What is claimed is:

1. In combination with a refrigerating system for motor vehicles having a compressor, means for driving said compressor comprising a power take-off connecting with a vehicularly driven shaft and a hydraulically operated clutch having a driving shaft connected with said power take-off, a driven shaft connecting with said compressor, and a pump connected to and driven by said driving shaft and supplying liquid under pressure to the clutch whereby when the vehicularly driven shaft is not operating no liquid is supplied for actuating the clutch.

2. In a system for refrigerating the body of a motor vehicle, the combination of a refrigeration device including an evaporator, a condenser and a compressor, means for driving said compressor in a first instance from a vehicularly driven shaft comprising a power take-off connected with said drive shaft, and a hydraulically operated clutch having a driving shaft connected with said power take-off and a driven shaft connected with said compressor, said clutch being constructed and adapted to be automatically disengaged when the vehicle is stopped, and means for driving said compressor in a second instance comprising an electric motor, an overrunning clutch connecting with a drive shaft of said electric motor, a belt driven pulley attached to said driven shaft of said hydraulically operated clutch, a thermostatically controlled valve for effecting the engagement and release of said hydraulically operated clutch, a relay switch for controlling the operation of said electric motor, and a first and second thermostat for controlling respectively the operation of said valve and said relay switch.

3. In combination with a refrigerating system for motor vehicles having a compressor, means for driving said compressor comprising a power take-off connecting with a vehicularly driven shaft and a hydraulically operated clutch having a driving shaft connected with said power take-off, a driven shaft connecting with said compressor, a pump connected to and driven by said driving shaft and supplying liquid under pressure to the clutch whereby when the vehicularly driven shaft is not operating no liquid is supplied for actuating the clutch, and means for bleeding said liquid from said clutch when said pump is not operating.

4. In combination with a refrigerating system for motor vehicles having a compressor, means for driving said compressor comprising a power take-off connecting with a vehicularly driven shaft and a hydraulically operated clutch having a driving shaft connected with said power take-off, a driven shaft connecting with said compressor, a pump connected to and driven by said driving shaft and supplying liquid under pressure to the clutch whereby when the vehicularly driven shaft is not operating no liquid is supplied for actuating the clutch, and means for preventing said pump from immediately building up clutch actuating pressure for a period subsequent to the actuation of said pump.

5. In combination with a refrigerating system for motor vehicles having a compressor, means for driving said compressor comprising a power take-off connecting with a vehicularly driven shaft and a hydraulically operated clutch having a driving shaft connected with said power take-off, a driven shaft connecting with said compressor, a pump connected to and driven by said driving shaft and supplying liquid under pressure to the clutch whereby when the vehicularly driven shaft is not operating no liquid is supplied for actuating the clutch, means for bleeding said liquid from said clutch when said pump is not operating and a thermostatically controlled valve for controlling the flow of liquid under pressure to said clutch when said driven shaft is operating.

6. In combination with a refrigerating system for motor vehicles having a compressor, means for driving said compressor comprising a power take-off connecting with a vehicularly driven shaft and a hydraulically operated clutch having a driving shaft connected with said power take-off, a driven shaft connecting with said compressor, a pump connected to and driven by said driving shaft and supplying liquid under pressure to the clutch whereby when the vehicularly driven shaft is not operating no liquid is supplied for actuating the clutch, means for bleeding said liquid from said clutch when said pump is not operating, a thermostatically controlled valve for controlling the flow of liquid under pressure to said clutch when said driven shatf is operating, and thermostatically controlled means for actuating said compressor when said driving shaft is not operating.

ALFRED C. RATERMANN.

REFERENCES CITED

The following references are of record in the file of this patent:

UNITED STATES PATENTS

| Number | Name | Date |
|---|---|---|
| 2,096,712 | Fourness et al. | Oct. 26, 1937 |
| 2,104,696 | Hanson | Jan. 4, 1938 |
| 2,199,090 | Palmer | Apr. 30, 1940 |
| 2,220,321 | Eddins | Nov. 5, 1940 |
| 2,317,135 | Crittenden et al. | Apr. 20, 1943 |
| 2,328,092 | Nutt et al. | Aug. 31, 1943 |